United States Patent [19]
Gupta et al.

[11] 3,978,408
[45] Aug. 31, 1976

[54] CIRCUIT ARRANGEMENT FOR SELECTING A DIVERSITY CHANNEL

[75] Inventors: Jutta Das Gupta, Wolfratshausen; Wernhard Markwitz; Max Ollinger, both of Munich, all of Germany

[73] Assignee: Siemens Aktiengesellschaft, Munich, Germany

[22] Filed: Dec. 5, 1974

[21] Appl. No.: 529,826

[30] Foreign Application Priority Data
Dec. 6, 1973    Germany............................ 2360930

[52] U.S. Cl................................ 325/56; 325/304; 325/363
[51] Int. Cl.²......................................... H04B 7/08
[58] Field of Search ................. 325/2.3, 31, 39, 40, 325/47, 56, 61, 67, 301, 302, 304, 321, 323, 363; 343/178, 203, 205; 179/15 BS

[56] References Cited
UNITED STATES PATENTS

| | | | |
|---|---|---|---|
| 3,213,370 | 10/1965 | Featherston | 325/304 |
| 3,354,433 | 11/1967 | Minc | 325/56 |
| 3,681,694 | 8/1972 | Sarati | 325/56 |
| 3,878,463 | 4/1975 | Lanigan | 325/2 |

Primary Examiner—Robert L. Griffin
Assistant Examiner—Jin F. Ng
Attorney, Agent, or Firm—Gerald L. Lett

[57] ABSTRACT

Apparatus for selecting a diversity channel in a data processing system is described. Data from a data source are assigned a signal whose binary values change within a given test period. At the receiver, a test device produces test signals indicating parameters of the received signals, and in dependence upon the test signals one of the diversity channels is connected by a channel switch to a data sink.

7 Claims, 8 Drawing Figures

CIRCUIT ARRANGEMENT FOR SELECTING A DIVERSITY CHANNEL

BACKGROUND OF THE INVENTION

This invention relates to a circuit arrangement for selecting a diversity channel in a data transmission system.

Two or more diversity channels can be provided via which data are transmitted in accordance with a space diversity process, time diversity process or frequency diversity process. Each of the latter processes is well known and will not be described in detail herein. The data can be coded at the transmitting end using a convoluational code or using a block code, so that data faults are recognized on the basis of the received parity bits and information bits.

With known diversity processes the quality of the data transmission can be improved and the fault rate reduced. If, however, the receiving level is used as criterion for channel selection it is the channel which at a specific time is transmitting a signal with the relatively higher level which is switched through. This known process does not always lead to the desired success, and in particular when signals from an alien transmitter are transmitted with very high levels over a channel there is a risk these undersized signals will be received. This is particularly disadvantageous when the alien transmitter is an interfering transmitter so that the very channel which in no case should be switched through is in fact given perference.

A further difficulty in the selection of one of the diversity channels occurs when it is likely that all the existing diversity channels will be disturbed in such manner that frequently the correct code frame is not brought into phase at the receiving end.

An object of the invention is, therefore, to provide a circuit arrangement for selecting a diversity channel in which the channel selection is not made in accordance with the criterion of the receiving levels, and which operates satisfactorily even when the code frame is not yet known.

SUMMARY OF THE INVENTION

In accordance with the invention, for each diversity channel a test device produces test signals of a first type which signal the absence of changes in binary values in the signals transmitted over the diversity channels, and the test device produces test signals of a second type which signal distortions of the signals transmitted over the diversity channels. A quality evaluation stage is provide which in dependence upon the test signals of the first and second type, produces control signals for controlling a channel switch.

Because the circuit arrangement according to the invention provides that one of the diversity channels is selected entirely independently of the level of the transmitted signals, the circuit arrangement is characterized in that the best channel is found even when, as a result of interference signals, signals with very high receiving levels are received over one of the channels. A further advantage of the circuit arrangement of the invention is that it enables channel selection even when the correct code frame has not yet been found. Even when the code frame has not yet been correctly brought into phase, the test signals of the first and second types supply criteria which enable the individual diversity channels to be evaluated.

If it is likely that one of the diversity channels will receive a signal which has a speed differing from a theoretical speed, then the test device will also produce test signals of a third type which characterize the speed of the transmitted signals.

The test signals of the first and second type, and also of the third type should relate to a period of time which is at least equal to the duration of the given test period. If the bit fault rate is likely to change substantially during individual test periods, the aforementioned period of time should be equal to the test period. If, however, experience shows that the changes in the bit fault rate will extend over several test periods, the aforementioned period of time should be a multiple of the test period.

In the evaluation of the channels, the test signals of the first type which signal the absence of a change in binary value are assigned a greater significance than the test signals of the second type, and the possibly produced test signals of the third type. In order to effect a differing evaluation of this type and to store the test signals which are produced, in a preferred exemplary embodiment of the present invention, for each channel there is provided a counter which is supplied via a first and second input with the test signals of the first and second types and/or third type, as counter pulses. After a counting time which can be equal to the test period or a multiple thereof, the counter is reset. The count reached by the counter is increased more with the test signals of the first type than with the test signals of the second type and/or the third type. Via the outputs of the counters, counter signals are emitted which represent the counts of the counters. A plurality of logic circuits are used to produce the control signal with which the channel switch is controlled.

BRIEF DESCRIPTION OF THE DRAWINGS

In the following the preferred embodiments of the invention will be described making reference to FIGS. 1 through 8, in which components appearing in more than one figure have been provided with the same reference.

DETAILED DESCRIPTION OF THE DRAWINGS

Figure 1:
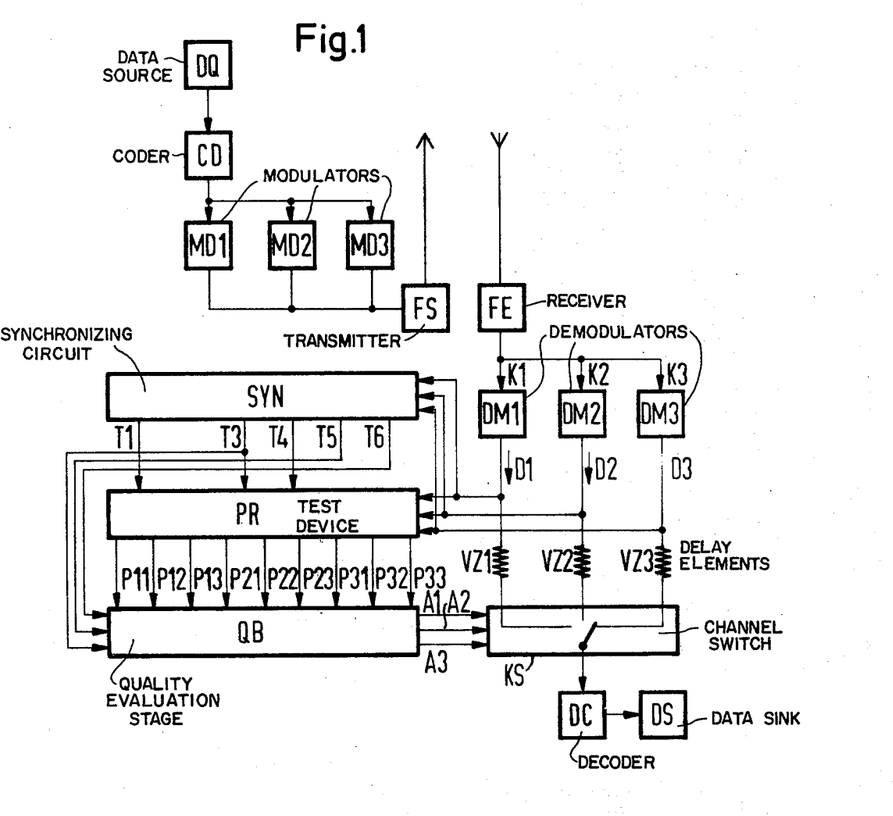
FIG. 1 is a block-schematic diagram of a data transmission system with a plurality of diversity channels.

FIG. 1 shows a data transmission system comprising a data source DQ, coder CD, modulators MD1, MD2, MD3, radio transmitter FS, radio receiver FE, demodulators DM1, DM2, DM3, delay elements VZ1, VZ2, VZ3, test device PR, channel switch KS, decoder DC, data sink DS, and synchronizing stage SYN.

The data source DQ can, for example, be a teleprinter which emits consecutively the individual bits of a character, which are the binary values 0 and 1. The coder CD recodes the data supplied at the input. When the coder receives at its input a signal equal to the zero value or the one value for a long period of time, it emits a signal whose binary value changes. A carrier is modulated with the output signal of the coder in the modulators MD1, MD2, MD3. The frequencies of these carriers differ and are within the speech frequency band from 0.3 to 3.4 kHz. The outputs of the modulators are connected to one another so that the radio transmitter FS is supplied with a signal mixture composed of the modulated carriers. In the radio transmitter FS the speech band is frequency-converted into a short wave band, and is emitted after power amplification.

The radio receiver FE receives the signal mixture and feeds its output signal, via the channels K1, K2, K3, to the three modulators DM1, DM2, DM3. The demodulated signals D1, D2, D3 are conducted from the outputs of the demodulators to the test device PR, the synchronizing stage SYN and the delay stages VZ1, VZ2, VZ3.

Figure 3:
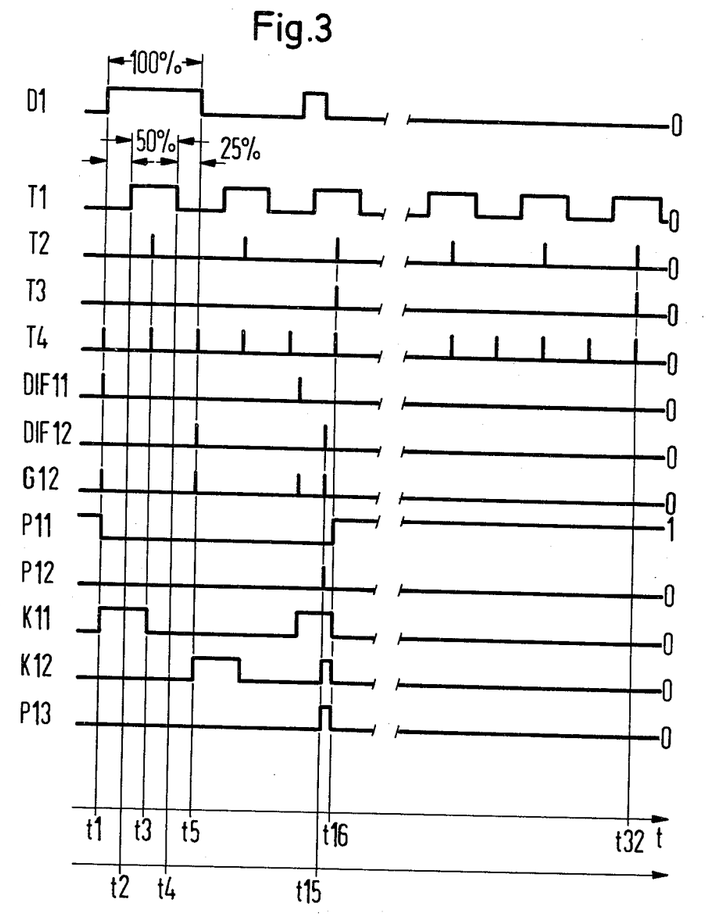
FIG. 3 is a time-waveform diagram of signals which are produced within the test device illustrated in FIG. 2.
Figure 6:
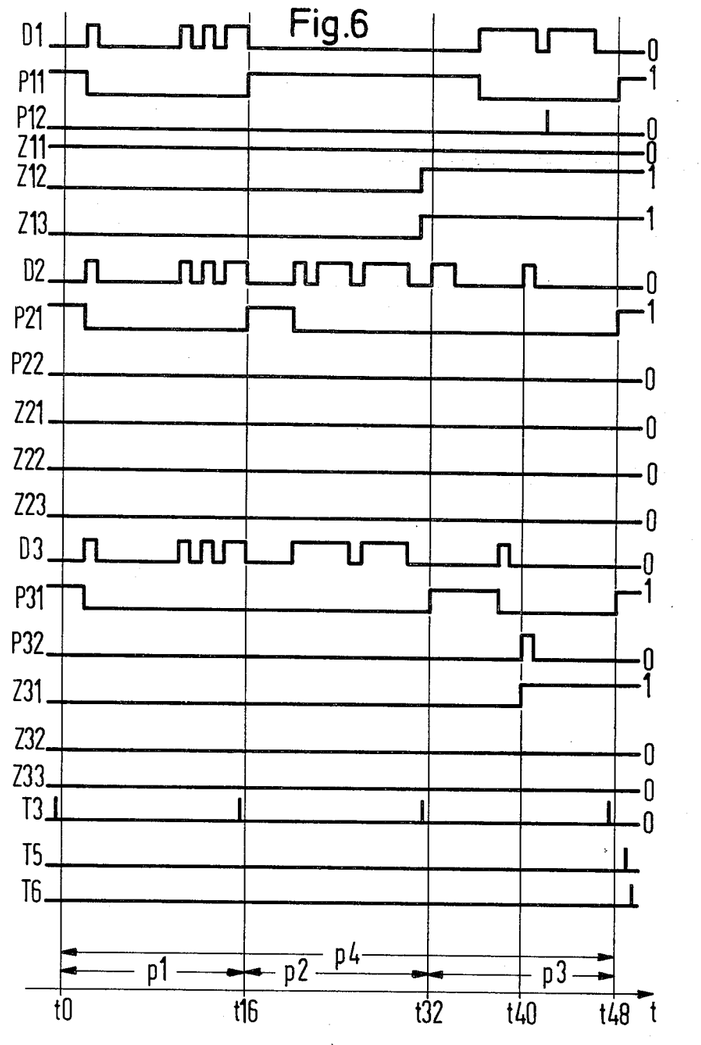
FIG. 6 is a time-waveform diagram showing signals which occur during the operation of the quality evaluation stage illustrated in FIG. 5.

Signals T1–6 having the characteristics illustrated in FIGS. 3 and 6 are produced in synchronizing device SYN responsive to the occurrence of and characteristics of the transmitted data, as discussed hereinbelow. Obviously, synchronizing device SYN can be any conventional pulse generating device capable of producing the illustrated waveforms.

The test device produces three types of test signals for each of the three channels, so that a total of nine different test signals are produced. The first index of the test signals relates to the assigned channel, and the second index of the test signals relates to the nature of the signal.

The signals P11, P21, P31 indicate whether changes in binary value occur in the signals D1, D2, D3. The signals P12, P22, P32 indicate distortions of the signals D1, D2, D3, and the signals P13, P23, P33 indicate speeds of individual bits of the signals D1, D2, D3.

The quality evaluation stage QB determines the channel which enables the best data transmission at a given time. With the signals A1, A2, A3 and with the channel switch KS one of the channels K1, K2, K3 is switched through to the input of the decoder DC. The data sink DS receiving the decoder output can, for example, be a teleprinter.

The data transmission system illustrated in FIG. 1 relates to a frequency diversity system. The invention may be used in the same way in a space diversity system and a time diversity system. Instead of the three channels illustrated in FIG. 1, also, only two channels or more than three channels can be provided.

Figure 2:
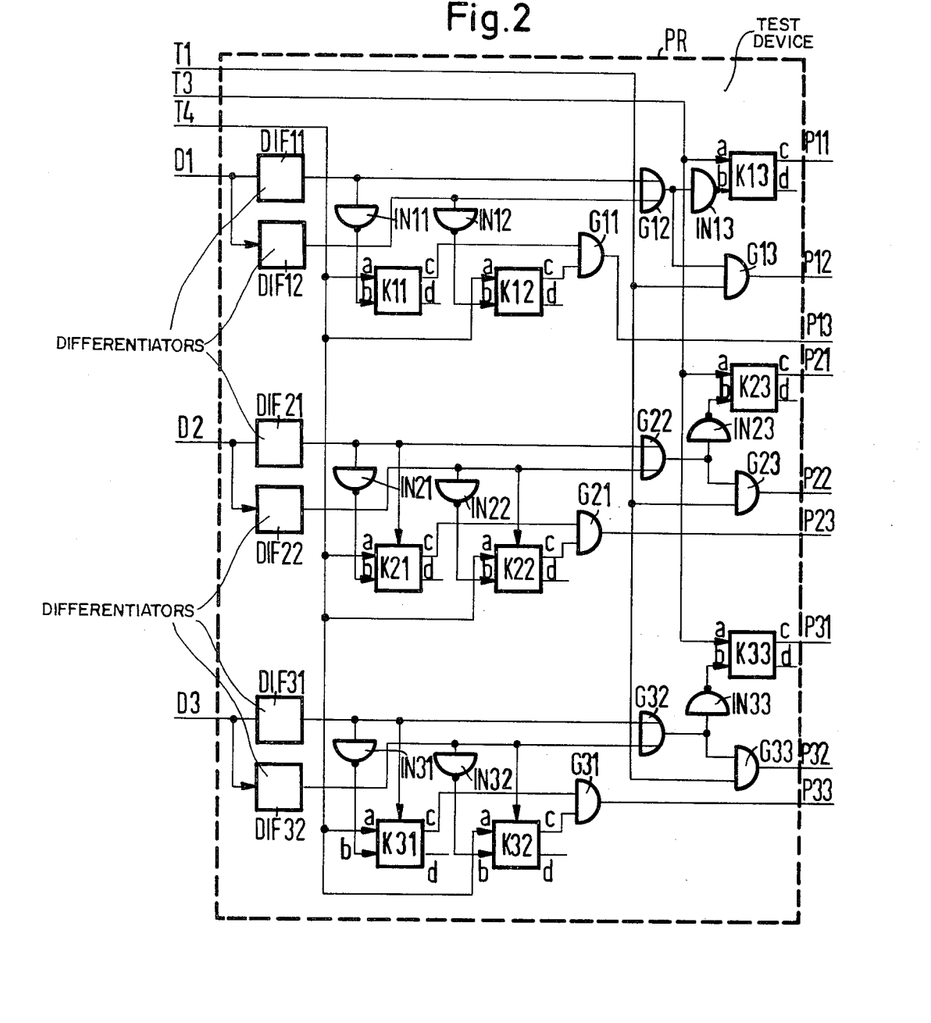
FIG. 2 is a schematic diagram of a test device for acquiring several types of test signals.

FIG. 2 shows in more detail the test device PR which is schematically illustrated in FIG. 1. For the first channel, second channel and third channel, respectively, the test device contains differentiator stages DIF11, DIF12, and DIF21, DIF22, and DIF31, DIF32; bistable trigger K11, K12, K13; and K21, K22, K23 and K31, K32, K33; AND gates G11, G13, and G21, G23, and G31, G33; the OR gates G12 and G22 and G32 and the inverters IN11, IN12, IN13 and IN21, IN22, IN23 and IN31, IN32, IN33. The trigger stages each have two inputs *a* and *b* and two outputs *c* and *d*. Their two stable states are referred to as zero and one states. During their zero and one states, they emit a zero and one signal, respectively, via the output *c*. There is a transition from the zero state into the one state with the negative edge of a signal present at the input *a* and a one signal at the input *b*. There is a transition from the one state into the zero state, again with a negative edge of a signal at the input and with a zero signal at the input *b*.

In the following the mode of operation of the test device PR illustrated in FIG. 2 will be explained making reference to the signals illustrated in FIG. 3 in association with the first channel. The test device operates in a similar fashion in respect of the second and the third channel.

The signal D1 represents the data transmitted over the first channel. From the time $t1$ until the time $t5$ the one value of a bit is transmitted, corresponding to a duration of 100%. The signals T1, T2, T3, T4 are produced with the synchronizing device SYN schematically illustrated in FIG. 1. From the time $t2$ until the time $t4$ a pulse of the signal T1 is produced corresponding to a duration of 50%. The duration $t2 - t1$ and $t5 - t4$ in each case amounts to 25%. The pulses of the signal T2 fall into the middles of the pulses of signal T1. The pulses of the signal T3 characterize the durations of the test period which in the present case has been assumed to be 10 bits. The pulses of the signal T4 have double the pulse repetition frequency of the pulses of the signal T2.

With the differentiator stages DIF11 and DIF12 pulses corresponding to the positive and negative edges of the signal D1 are emitted. The signals DIF11, DIF12, G12, K11, K12 are provided with the same references as the components by which they are emitted. Via the gate G12 both the pulses of the signal DIF11 and DIF12 are emitted. It is assumed that the trigger stage K13 assumes its one state before the time $t1$, so that the signal P11 also has a one value up to time $t 1$. At the time $t1$, the signal G12=1 so that a zero signal is present at the input *b*, and with the negative edge of the signal T3 there is a transition into the zero state in which it remains until the time $t16$. The signal P11 emitted by the trigger stage K13 characterizes existing and absent changes of binary value of the signal D1 within a test period with P11=0 and P11=1, respectively.

In the event of the coincidence of signals G12 and T1 the signal P12 is produced at the output of the gate G13, and the signal indicates distortions of more than ± 25% of the duration of a bit. This situation occurs, under the assumed conditions, when pulse edges of the signal D1 coincide with the pulses of the signal T1, as is the case at the time $t15$.

The output signals of the trigger stages K11 and K12 are conducted to the gate G11. If the rate of the individual pulses of the signal D1 is within a given theoretical range, the signals K11 and K12 do not overlap. If one of the pulse edges of the signal D1, such as, for example, the pulse edge which occurs at the time $t15$ leads substantially, then the pulses of the signals K11 and K12 overlap, and via the gate G11, the signal P13 is emitted which, with P13=1, indicates that the number of bits per second is too high.

Figure 4:
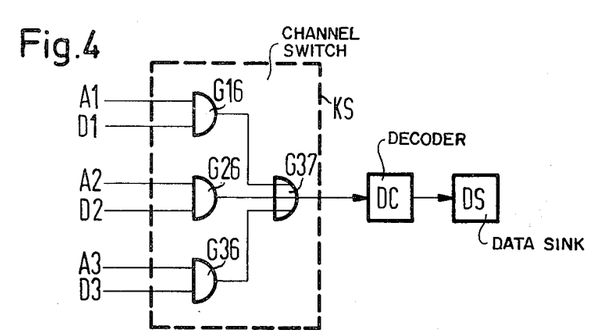
FIG. 4 is a detailed schematic diagram of the channel switch in the FIG. 1 embodiment.

FIG. 4 shows an exemplary embodiment of the channel switch KS which is schematically illustrated in FIG. 1 and which comprises AND gates G16, G26, G36 and OR gate G37.

Figure 5:
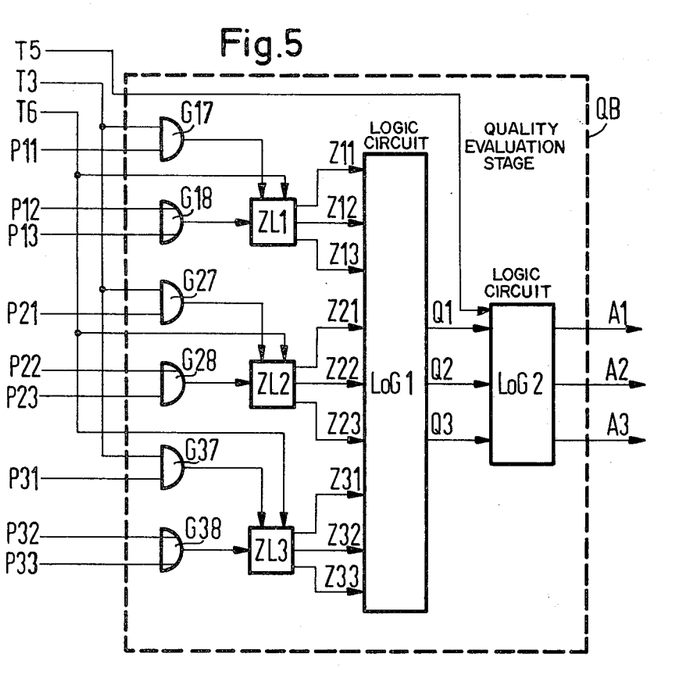
FIG. 5 is a detailed schematic diagram of the quality evaluation stage in the FIG. 1 embodiment.

FIG. 5 shows an exemplary embodiment of the quality evaluation stage QB which is schematically illustrated in FIG. 1 and which comprises gates G17, G18, G27, G28, G37, G38, counters ZL1, ZL2, ZL3 and logic circuits LOG1, LOG2. In the following the mode of operation of the quality evaluation stage which has been illustrated in FIG. 5 will be explained making reference to the signals shown in FIG. 6. It will be assumed that from the time $t0$ to the time $t16$ during the test period $p1$ a total of 16 bits of the signals D1, D2, D3 are transmitted. A second test period $p2$ commences at the time $t16$ and ends at the time $t32$, and a third test period $p3$ starts at the time $t32$ and ends at the time $t48$. During each test period, with the test device PR illustrated in FIG. 2, a first series of signals P11, P21, P31 is emitted whereby the absence of bit changeovers of the signals D1, D2, D3 is signalled. Also, with the test device PR a second series of test signals P12, P22, P32 is emitted which signal distortions of more than ± 25%. Further, a third series of test signals P13, P23, P33 can be emitted for indicating the rate of the individual bits of the signals D1, D2, D3; this third series is not represented in FIG. 6. The gates G18, G28, G38 are supplied with the signals P12, P13, P22, P23, P32, P33, and the pulses emitted via these gates are conducted, as counter pulses, to the counters ZL1, ZL2, ZL3. It will be assumed that the illustrated counters can each reach a maximum count of six, and emit attained counted values as binary words via the lines Z11, Z12, Z13, Z21, Z22, Z23, Z31, Z32, Z33 to the logic circuit LOG1. The counters count during the counter period $p4$ from the time $t0$ to the time $t48$ and are then reset with a pulse of the signal T6. In many cases, in dependence upon the likely faults, it can be advantageous to contrive the counter period $p4$ to be equal to the test period $p1$, and in other cases it is advantageous to contrive the counter period $p4$ to be equal to a multiple of the test period. In the present case the counter period $p4$ is equal to three test periods.

The signal T3 and the signals P11, P21, P31 are conducted to the gates G17, G27, G37, and when a one signal is emitted to the counters ZL1, ZL2 and ZL3, the counts of these counters are increased. In dependence upon the faults which may be expected, it can be advantageous to increase the counts only by one or by several units, and it can be advantageous to also set the maximum counts. In the present exemplary embodiment, shortly before the time $t32$, a one signal is fed from the gate G17 to the counter ZL1, and thus, the maximum count of six of this counter is set. Thus, via the output lines Z13, Z12, Z11, the word 110 is emitted which, as a binary number, characterizes the count of six. The counter ZL2 emits the word 000 and at the time $t40$ the counter ZL3 emits the word 001 corresponding to the count of one.

Figure 7:
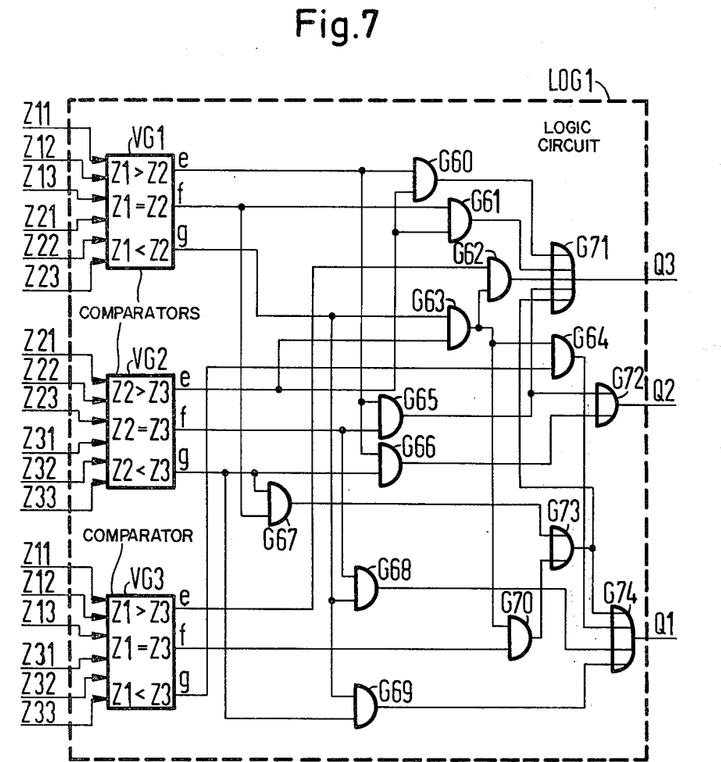
FIG. 7 is a detailed schematic diagram of a first logic circuit which is used in the quality evaluation stage shown in FIG. 5.

FIG. 7 shows in more detail the logic circuit LOG1 which has been schematically illustrated in FIG. 5 and comprises comparators VG1, VG2, VG3, AND gates G60 – G70, and the OR gates G71 – G74.

The comparator VG1 obtains the output signals of the counters ZL1 and ZL2 shown in FIG. 5, the comparator VG2 obtains the output signals of the counters ZL2 and ZL3 and the comparator VG3 obtains the output signals of the counters ZL1, ZL3. The comparator VG1 emits a one signal from the outputs $e, f$ and $g$, if the word emitted from the counter ZL1 is greater than or equal to or smaller than, respectively, the word emitted from the counter ZL2. The comparator VG2 emits one signals via the outputs $e, f$ and $g$ if the word emitted by the counter ZL2 is greater than or equal to or smaller than, respectively, the word emitted from the counter ZL3. The comparator VG3 emits a one signal via the outputs $e, f$ and $g$ when the word emitted from the counter ZL1 is greater than or equal to or smaller than, respectively, the word emitted from the counter ZL3.

The numbers which correspond to the words emitted from the counters will be referred to in the following as Z1, Z3, Z3. When the number Z1 is greater than the number Z2, and the number Z2 is greater than the number Z3, this means that the number Z3 is the smallest and thus represents the best channel. In this case one signals are emitted via the outputs $e$ of the comparators VG1 and VG2 to the gate G60, so that the signal Q3=1 is emitted via the gate G71. The signals Q2 and Q1 are both 0.

When the number Z1 is greater than Z2, and the number Z2 is equal to the number Z3, the outputs $e$ and $f$ of the comparators VG1 and VG2, respectively, each emit one signals to the gate G65 so that the signals Q3=1 and Q2=1 are then emitted. This means that the channels K3 and K2 are of equally good quality. The signal Q1 is then 0.

When the number K1 is greater than the number Z2, and the number Z2 is smaller than the number Z3, one signals are emitted via the outputs $e$ and $g$ of the comparators VG1 and VG2 to the gate G66, as a result of which the signal Q2=1 is produced. Here, Q1=0 and Q3=0. In this case the channel K2 is consequently the best. If the number Z1 is equal to the number Z2, and the number Z2 is greater than the number Z3, then one signals are emitted via the outputs $f$ and $e$ of the comparators VG1 and VG2 to the gate G61, so that the signal Q3=1 is emitted. In this case the number Z3 is the smallest so that the corresponding channel K3 proves to be the best.

If all the numbers Z1, Z2, Z3 are equal, and one signals are emitted from the outputs $f$ of the comparators VG1 and VG2, the signals Q1=0, Q2=0 and Q3=0 are produced. In this case the three channels are either equally good or equally poor. It would also be conceivable to design the logic circuit LOG1 in such manner that in this case the signals Q1=1, Q2=1, and Q3=1 are emitted.

If the numbers Z1 and Z2 are both smaller than Z3, one signals are emitted from the outputs $f$ and $g$ of the comparators VG1 and VG2 to the gate G67 so that the signals Q1=1 and Q2=1 are produced. The channels K1 and K2 in this case are thus equally good.

If the number Z1 is smaller than the number Z2, the number Z3 is smaller than the number Z2 and the number Z1 is smaller that the number Ze, one signals are emitted from the outputs $g, e$ and $g$, respectively, of the comparators VG1, VG2, VG3 to the gates G63 and G64 so that the signal Q1=1 is produced. Thus, in this case the channel K1 is the best.

If the numbers Z1 and Z3 are equal and both are smaller than the number Z2, one signals are emitted from the outputs $g, e$ and $f$ of the comparators VG1, VG2, and VG3, respectively, to the gates G63 and G70 so that the signals Q=1 and Q=1 are produced. Thus, in this case the channels K1 and K3 are equivalent.

If the numbers Z1 and Z3 are both smaller than Z2 and the number Z3 is smaller than the number Z1, one signals are emitted from the outputs $g, e$ and $e$, respectively, to the gates G63 and G62 so that the signal Q3=1 is produced. Thus, in this case the channel K3 is the best.

If the number Z1 is smaller than the two numbers Z2 and Z3, then one signals are emitted from the outputs $g$ and $f$ of the comparators VG1 and VG2, respectively, to the gate G68 so that the signal Q1=1 is produced.

If, finally, the number Z1 is smaller than Z2, and Z2 is smaller than Z3, the one signals are emitted from the outputs $g$ of the comparators VG1 and VG2 to the gate G69, so that the signal Q1=1 is produced. Thus, in this case the channel K1 is the best.

Figure 8:
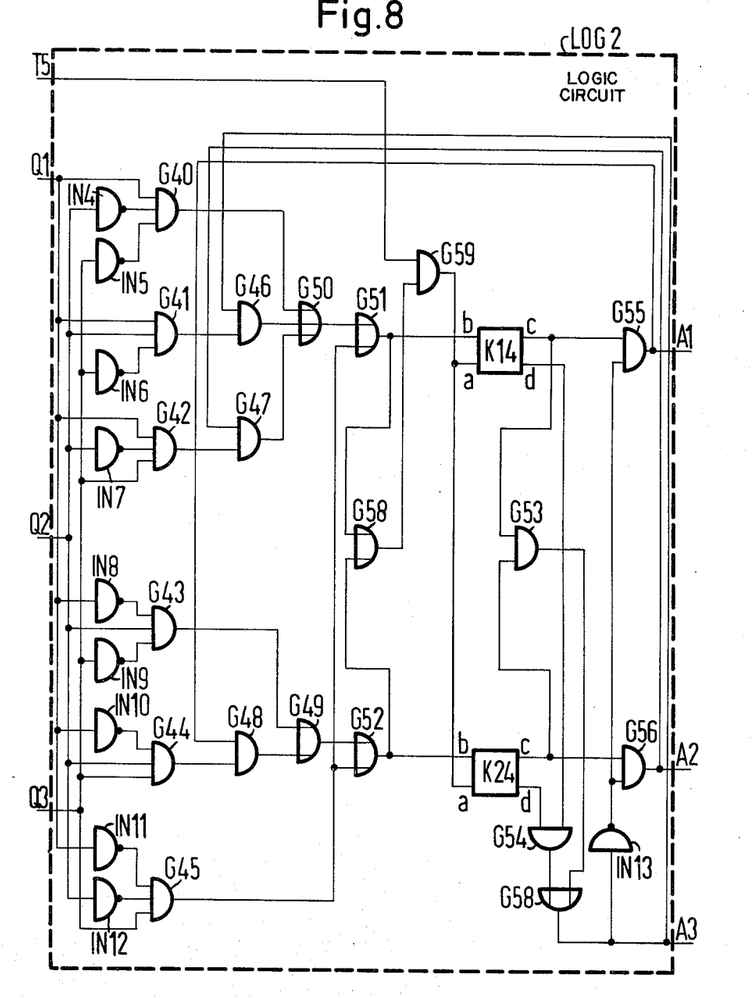
FIG. 8 is a detailed schematic diagram of a second logic circuit which is likewise used in the quality evaluation stage shown in FIG. 5.

FIG. 8 shows in more detail the logic circuit LOG1 which has been schematically illustrated in FIG. 5 and which comprises inverters IN4 – IN13, and AND gates G40 – G48 and G53 – G59, OR gates G49, G51, G52, G58 and trigger stages G14 and K24 which operate similarly to the trigger stages described with reference to FIG. 2.

With their one values, the signals Q1, Q2, Q3 characterize the channels which are to be preferred and represent a total of eight different words. With Q1=1, Q2=0 and Q3=0, the word 100 is produced which results in a one signal at the output of the gate G40 and zero signals at the outputs of the gates G41 to G45. The one signal of the gate G40 is conducted via the gates G50, G51 to the input of a trigger stage K14, where it causes a one signal to be emitted from the latter's output $c$. Because a zero signal is emitted from the output $d$ of the trigger stage K14 to the gate G54, a zero signal is also emitted from the output of the gate G58, and via the inverter IN13, the gate G55 obtains a one signal and emits the signal K1=1. Because the trigger stage K24 emits a zero signal to the gate G56 from the output $c$, under the imposed condition, the signal A2=0. With the signal K14$d$=0, the gate G54 is blocked and the signal A3=0. The word A1 A2 A3 = 1 0 0 causes the first channel K1 to be connected, if it was not already connected, and causes the first channel to remain connected, if it was already connected.

When the word Q1 Q2 Q3 — 0 1 0 is conducted to the logic circuit, via the gate G43, a one signal is emitted which, similarly as in the case of the gate G40, causes a one signal to be emitted via the output $c$ of the trigger stage K24. In this case the gate G56 receives a one signal from the trigger stage K24 and via the inverter IN13, so that the signal A2=1 is emitted. Thus, from the output of the logic circuit the word A1 A2 A3 = 0 1 0 is emitted which causes the second channel to be connected, if it was not previously connected, and to remain connected, if it was connected.

With the word Q1 Q2 Q3 = 0 0 1, from the gate G45 there is emitted a one signal which sets the two trigger stages K14 and K24 to their one states so that from their outputs $c$ the gate G53 is opened and the signal A3=1 is emitted via the gate G58. With the inverter IN13 the gates G55 and G56 are blocked so that the signals A1=0 and A2=0. With the word A1 A2 A2 = 0 0 1 emitted from the logic circuit, the third channel remains connected, if it was previously connected, and is connected, if a different channel was previously connected.

With the word Q1 Q2 Q3 = 1 1 0, the gate G41 is opened, and if previously with A3=1 the third channel was connected, a one signal is emitted via the gate G46 and the gates G50 and G51 to the trigger stage K14, and with A1=1 the first channel is connected. Thus, in this case the channel which has the smaller number is connected. If previously with A1=1 or A2=1 and A3=0 either the first or the second channel was connected, the gates G46, G58 remain blocked and the previous channel remains connected.

With the word Q1 Q2 Q3 = 1 0 1, the gate G42 is opened, and if previously with A2=1 the second channel was connected, via the gate G47, a one signal is emitted which, with A1=1, causes the first channel to be connected. Also in this case, of the two currently equivalent channels 1 and 3 it is the channel with the lower number 1 which is connected. If with A1=1 of A3=1 and A2=0, previously either the first or the third channel was connected, the gates G47, G58 remain blocked, the trigger stages K14 and K24 remain in their previous states and the previously connected channel remains connected.

When with the word Q1 Q2 Q3 = 0 1 1, the gate G44 is opened, then with the gates G48, G58 and with A2=1 the second channel is connected if with A1=1 the first channel was previously connected. Of the two channels available for selection, thus, it is the channel with the lower number which is connected. If, with A2=1 or A3=1 and A1=0 either the second channel or the third channel was connected, the gate G48 remains blocked and the previous channel remains connected.

With the words Q1 Q2 Q3 = 0 0 0 and Q1 Q2 Q3 = 1 1 1, the gates G40 to G45 remain closed, and none of these emits a one signal, so that no channel switch-over takes place.

The principles of the invention are described hereinabove by describing the construction and operation of a preferred embodiment. The described embodiment is to be considered only as being exemplary, and it is contemplated that the described embodiment can be modified or changed in a variety of ways while remaining within the scope of the invention, as defined by the appended claims.

We claim:

1. In a data transmission system, apparatus for selecting one of a plurality of diversity channels, comprising:
   receiving means for receiving data-modulated signals transmitted in each of said diversity channels, said data-modulated signals including binary data modulating signals which assume one of two binary states in time succession and wherein transitions between the two states occur within predetermined test periods,
   demodulating means for demodulating said received data-modulated signals and producing demodulated outputs on each of said diversity channels,
   test means for receiving said demodulated outputs and for producing therefrom test signals of a first type indicating the absence of binary transitions in a said demodulated output and test signals of a second type indicating the presence of distortions in a said demodulated output,
   quality evaluation means for producing control signals as a function of said first type test signals and said second type test signals and
   channel switch means for selectively connecting, responsive to said control signals, one of said diversity channels to a data sink.

2. The apparatus defined in claim 1 further comprising:
   means in said test means for producing test signals of a third type indicating the rate of said transmitted, data-modulated signals.

3. The apparatus defined in claim 1 wherein said test means comprises:

a pair of differentiators for each said diversity channel, each said pair of differentiators being connected, respectively, to one of said demodulated outputs, bistable trigger means for each said diversity channel, each said bistable trigger means being connected, respectively, to the outputs of said pair of differentiators for emitting said test signals of said first type.

4. The apparatus defined in claim 3 further comprising:

synchronizing means for producing a timing signal comprising a sequence of rectangular pulses which occur during given bit patterns and having pulse durations equal to a fraction of the bit duration of said demodulated outputs and second gating means having inputs coupled to receive outputs from said pairs of differentiator stages and said timing signal for emitting therefrom said second type test signals.

5. The apparatus defined in claim 1 wherein said quality evaluation stage comprises:

a plurality of counter means, one of which is assigned to each said diversity channel, each said counter means having first and second inputs coupled to receive, respectively, said test signals of said first and second types, each said counter means being constructed to respond with a greater count for said first type test signals, each said counter means including reset means operable after a counting time equal to a test period or a multiple thereof, each said counter means having outputs which represent increasingly higher counts in correspondence with the poorness of quality of the assigned diversity channel and means for producing said control signals responsive to said counter output signals.

6. The apparatus defined in claim 5 wherein said means for producing control signals comprises:

first logic circuit means for producing output signals indicative of the transmission qualities of said diversity channels and second logic circuit means having inputs coupled to receive said first logic circuit means output signals for producing said control signals.

7. The apparatus defined in claim 6 wherein said first logic circuit means includes a plurality of comparators, one of which is assigned to each said diversity channel, each said comparator having inputs coupled to outputs of two of said counter means and having three outputs for emitting signals which indicate whether one of said counted values is greater than the other and first gating means responsive to said comparator outputs for emitting said first logic circuit means output signals.

* * * * *